United States Patent

Yasuno et al.

[11] Patent Number: 5,851,657
[45] Date of Patent: Dec. 22, 1998

[54] CHARGING MEMBER

[75] Inventors: Michiaki Yasuno; Minoru Rokutan, both of Ebina, Japan

[73] Assignee: Fuji Xerox Co., Ltd., Tokyo, Japan

[21] Appl. No.: 792,223

[22] Filed: Jan. 31, 1997

[30] Foreign Application Priority Data

Feb. 19, 1996 [JP] Japan .................................. 8-030212

[51] Int. Cl.$^6$ .................................................. B32B 25/20
[52] U.S. Cl. ...................... 428/332; 428/36.91; 428/450; 492/53; 492/56; 492/59
[58] Field of Search .................................. 428/332, 450, 428/36.9, 36.91, 36.92; 492/56, 53, 59; 528/31, 32, 33, 14, 15

[56] References Cited

FOREIGN PATENT DOCUMENTS

| | | |
|---|---|---|
| A-3-249777 | 11/1991 | Japan . |
| A-4-120564 | 4/1992 | Japan . |
| A-6-25431 | 2/1994 | Japan . |
| A-7-166051 | 6/1995 | Japan . |

*Primary Examiner*—D. S. Nakarani
*Attorney, Agent, or Firm*—Oliff & Berridge, PLC

[57] ABSTRACT

A charging member is disclosed, which charges an electrifiable member, e.g., a photoreceptor, when a voltage is applied thereto while the charging member is kept being pressed against the electrifiable member. This charging member 1 comprises an electroconductive substrate 1a and, fixed thereto, an electroconductive elastomer layer 1b comprising at least a crosslinked silicone rubber, in which the content of uncrosslinked silicone polymer components having a number-average molecular weight of 10,000 or higher is not higher than 1% by weight. The crosslinked silicone rubber is preferably a reaction product obtained by reacting a liquid polymethylsiloxane containing at least two vinyl group substituents and having a viscosity of 3,000 cP or lower with a polyorganohydrogensiloxane as a crosslinking agent in the presence of a platinum catalyst. The charging member need not have an antifouling layer for inhibiting the migration of low-polymerization-degree components to an electrifiable member. It is free from the possibility of causing image defects and has excellent environmental stability of electrical resistance and excellent flexibility.

14 Claims, 3 Drawing Sheets

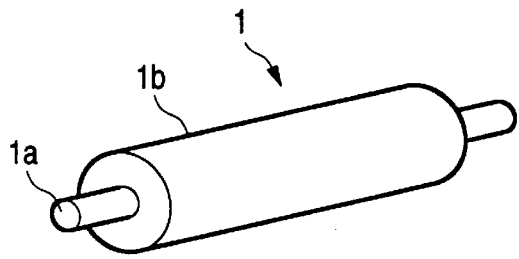
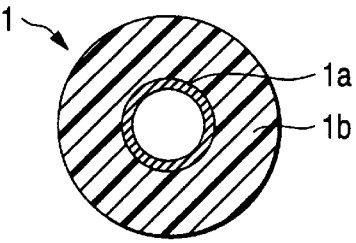
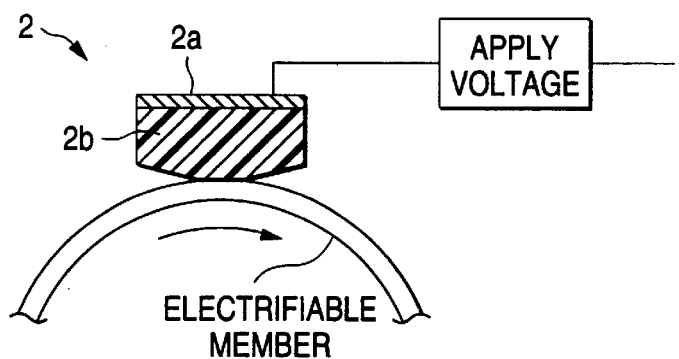
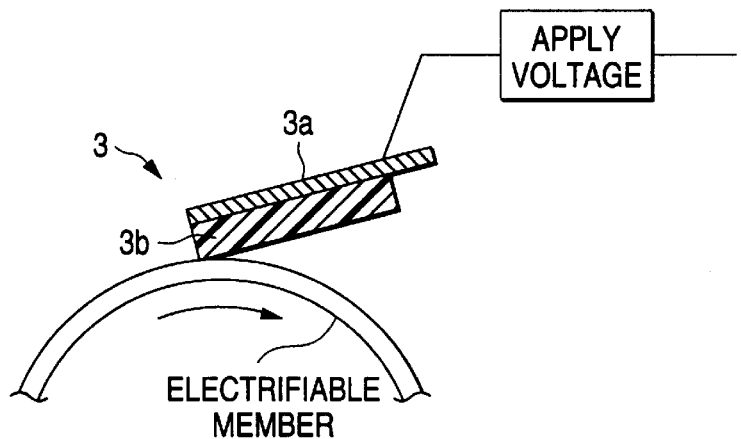

CHARGING MEMBER

FIELD OF THE INVENTION

The present invention relates to a charging member for use in electrophotographic apparatuses such as electrophotographic copiers, printers, facsimile telegraphs, and OA apparatuses performing two or more of the functions of those apparatuses and also in image-forming apparatuses such as electrostatic recorders. More particularly, the present invention relates to a charging member which is pressed against the surface of an electrifiable member such as a photoreceptor or a dielectric, to evenly charge the surface of the electrifiable member.

BACKGROUND OF THE INVENTION

In contact charging devices employing a roll- or blade-form electroconductive elastomer comprising a silicone rubber to which electroconductivity has been imparted with carbon black or the like, the silicone rubber is known to have a low hardness and relatively homogeneous electroconductivity and to be less influenced by fluctuations of environmental conditions such as temperature and humidity. However, use of the electroconductive silicone rubber has a problem that when the rubber is kept in contact with an electrifiable member such as a photoreceptor for one week or a longer period and is then used for charging, it causes image defects such as blank spots in the area corresponding to that part of the electrifiable member which was in contact with the rubber.

In order to cope with the above problem, proposals have been made on charging members. For example, JP-A-3249777 discloses a charging member comprising an elastic layer which is made of a silicone rubber containing carbon black dispersed therein and is coated with a surface layer consisting mainly of an N-methoxymethylated nylon, whereby the bleed phenomenon called a roller mark is prevented. (The term "JP-A" as used herein means an "unexamined published Japanese patent application.") In JP-A-4-120564 is disclosed a charging member comprising a lower layer which is a resistive layer made of a silicone rubber containing dispersed therein carbon black having an oil absorption of 80 ml/100 g or lower and is coated with a surface layer which is a resistive layer made of a resin containing electroconductive particles dispersed therein. In the above-cited reference, a polyurethane is shown as the resin constituting the surface layer.

These charging members are effective in some degree in mitigating the problem described above. However, the prior art charging members have insufficient durability because the surface layer has poor adhesion to the silicone rubber layer and this tends to result in surface layer peeling during long-term use and in other troubles. There is another problem that since the resin constituting the surface layer is apt to be influenced by fluctuations of environmental conditions such as temperature and humidity, a stable electrical resistance is not obtained.

On the other hand, with respect to a single-layer charging member which need not have a surface layer, the following proposals have, for example, been made. In JP-A-625431 is disclosed a silicone rubber roller for electrophotography and a process for producing the same, which roller is produced by preparing a silicone rubber compound in which the total concentration of lowly polymerized siloxane components and nonfunctional silicone oil components is not higher than 5,000 ppm, forming the rubber compound into a roller, crosslinking the same, and then heating the roller under vacuum to remove those siloxane and oil components, etc. This process, however, is disadvantageous in that the step for removal is very troublesome. In addition, even when the content of lowly polymerized components having a degree of polymerization of about from 4 to 25, which corresponds to a molecular weight not higher than 3,000, is reduced, this does not lead to the prevention of image defects such as blank spots, as is described later.

In JP-A-7-166051 is proposed a charging member comprising an electroconductive elastic layer made of a polyurethane obtained from a polyisocyanate and a PPG/PEG base polyol containing or not containing a perchlorate. However, this prior art charging member also is considerably influenced by fluctuations of environmental conditions such as temperature and humidity due to the polyurethane. In addition, there is a essential problem that when the elastic layer is made to have a reduced hardness, it shows enhanced adhesion to an electrifiable member and is apt to stick thereto.

As described above, the prior art two-layer charging members having a surface coating layer have problems that they have poor durability because of the poor adhesion of the surface layer to the silicone rubber layer, and that the electrical resistance fluctuates considerably depending on environmental conditions. The prior art single-layer charging members have the following problems. In the case of the charging member comprising a silicone rubber layer, not only the removal of lowly polymerized components is troublesome, but reducing the content thereof is substantially ineffective in eliminating the generation of image defects. In the case of the charging member comprising a polyurethane layer, it is considerably influenced by fluctuations of environmental conditions and is apt to stick to an electrifiable member.

SUMMARY OF THE INVENTION

An object of the present invention is to provide an improved charging member in which the charging surface is made of a silicone rubber elastomer having excellent environmental stability of electrical resistance and excellent flexibility by taking advantage of the properties of an electroconductive silicone rubber to thereby eliminate the problems described above.

Another object of the present invention is to provide a charging member which need not have an antifouling layer for inhibiting the migration of low-polymerization-degree components to an electrifiable member, is free from the possibility of causing image defects attributable to bleeding substances even when kept in contact with an electrifiable member, and can be produced through a process which need not involve a troublesome step for the removal of lowly polymerized components.

The present inventors made intensive investigations in order to specify the substances in a silicone rubber which cause image defects and to develop a method for diminishing the causative substances to the lowest possible level. In the course of the investigations, it was revealed that polysiloxane components having a number-average molecular weight in an oligomer region, i.e., not higher than several thousands, do not substantially participate in the generation of image defects, despite the fact that polysiloxane components having a low degree of polymerization have conventionally been regarded as the cause of image defects. They simultaneously revealed that uncrosslinked polysiloxane components having a number-average molecular weight of 10,000 or higher surprisingly produce a peculiar adverse influence on image quality. Thus, it was found that regulating a silicone rubber so as not to contain residual uncrosslinked polysiloxane components having such a high molecular weight is effective in preventing the generation of image defects caused by component migration to an electrifiable member.

It is noted that in known millable silicone rubbers to be crosslinked with a peroxide, the raw polymers contained therein consist mostly of high-molecular weight components having a number-average molecular weight of 10,000 or higher, and that the rubbers after crosslinking reaction usually contain unreacted high-molecular weight polysiloxane components remaining therein in an amount of about several percents. It was found that in contrast to such known silicone rubbers, a silicone rubber obtained by crosslinking a vinyl-substituted liquid polymethylsiloxane having a viscosity of 3,000 cP or lower (as measured at 25° C.; the same applies hereinafter) with a polyorganohydrogensiloxane contains almost no unreacted polysiloxane components having a number-average molecular weight of 10,000 or higher. By using an improved starting material as described above, the generation of bleed defects can be prevented without necessitating a post-treatment such as, in particular, extraction with a solvent. The present invention has been completed based on the above findings.

The present invention provides a charging member which is an electroconductive member which charges an electrifiable member when a voltage is applied thereto while the electroconductive member is kept being pressed against the electrifiable member, the electroconductive member comprising an electroconductive substrate and, fixed thereto, an electroconductive elastomer layer comprising at least a crosslinked silicone rubber, in which the content of uncrosslinked silicone polymer components having a number-average molecular weight of 10,000 or higher is not higher than 1% by weight.

The crosslinked silicone rubber is preferably a reaction product obtained by reacting a liquid polymethylsiloxane containing at least two vinyl group substituents and having a viscosity of 3,000 cP or lower with a polyorganohydrogensiloxane as a crosslinking agent in the presence of a platinum catalyst.

BRIEF DESCRIPTION OF THE DRAWINGS

FIG. 1 illustrates a charging member as one embodiment of the present invention; FIG. 1A is a slant view thereof and FIG. 1B is a sectional view thereof.

FIG. 2 illustrates charging members as other embodiments of the present invention; FIG. 2A and FIG. 2B are sectional views of different types of charging members.

DETAILED DESCRIPTION OF THE INVENTION

Figure 3:
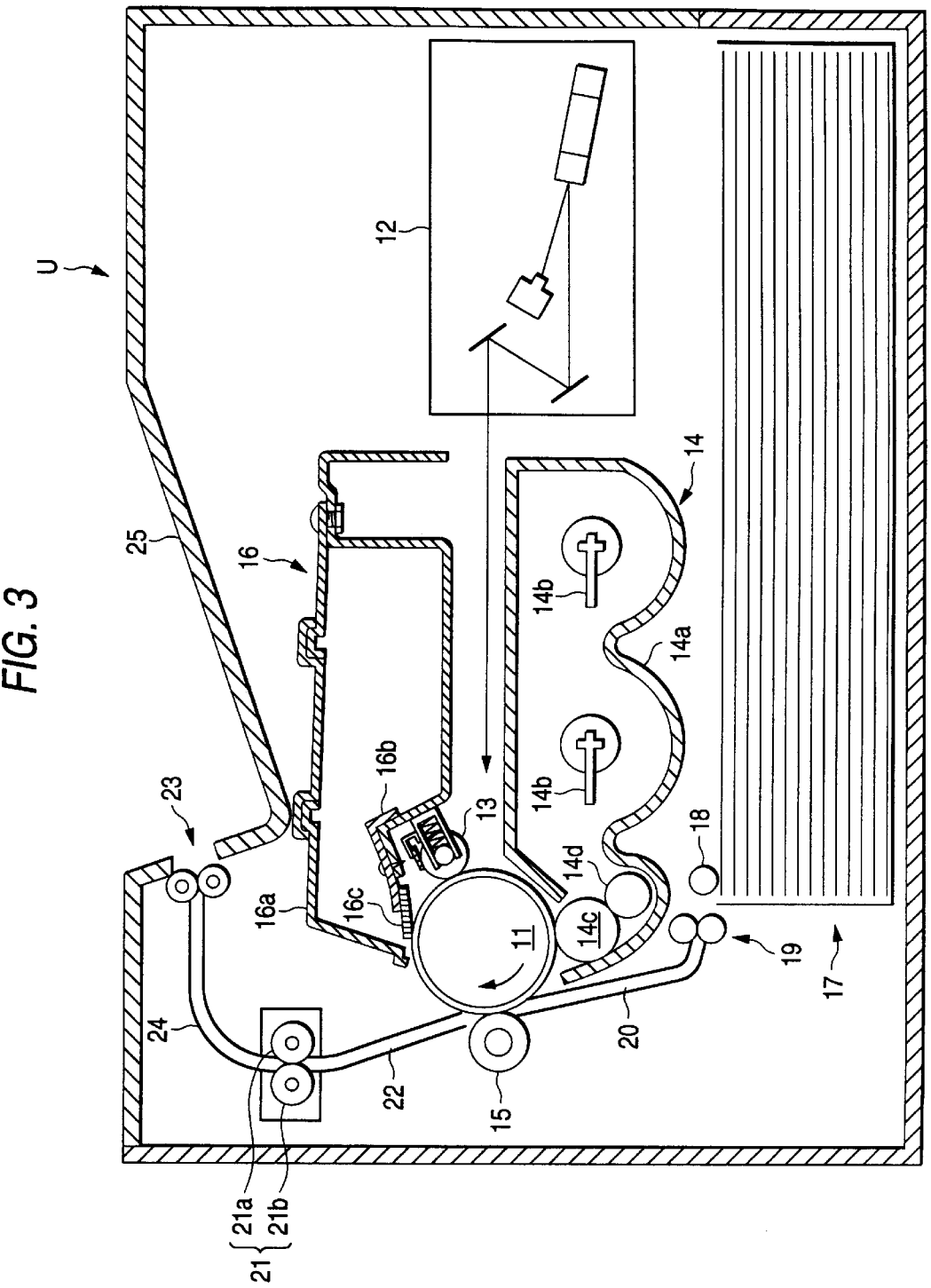
FIG. 3 is a view illustrating the whole of an image-forming apparatus into which a charging member of the present invention has been incorporated.

The charging member of the present invention, when used as a charging roll, comprises an electroconductive member which comprises an electroconductive substrate 1a in the form of a solid or hollow cylinder and an electroconductive elastomer layer 1b fixed to the outer surface of the substrate 1a, as shown in FIGS. 1A and 1B. A voltage is applied between the electroconductive substrate 1a of the charging member 1 and an electrifiable member (e.g., a photoreceptor 11 shown in FIG. 4).

The electroconductive substrate functions as both an electrode and a support of the charging member. This electroconductive substrate is made of an electroconductive material such as a metal or alloy, e.g., aluminum, a copper alloy, or stainless steel, or an iron or synthetic resin plated with chromium, nickel, etc. The electroconductive substrate usually has an outer diameter of from 4 to 10 mm.

The electroconductive elastomer layer has an appropriate hardness and an electrical resistance so that the charging member can evenly charge an electrifiable member when pressed against the surface of the electrifiable member at an appropriate nip width or nip pressure. This elastomer layer is made of a rubber material which is a crosslinked silicone rubber or consists mainly of the silicone rubber and which contains a conductive material.

Examples of the rubber material include the above described silicone rubber alone and a blend of a crosslinked silicone rubber with up to 20 wt % other rubber such as natural rubber, isoprene rubber, chloroprene rubber, EPDM, SBR, or NBR. The crosslinked silicone rubber is preferably obtained from a liquid silicone rubber comprising a combination of a polysiloxane having at least two alkenyl group substituents and a polyorganohydrogensiloxane which undergoes an addition reaction with the polysiloxane.

The liquid silicone rubber may be a two-liquid system consisting of liquid A comprising the alkenyl-substituted polysiloxane as a base polymer and liquid B comprising the polyorganohydrogensiloxane as a crosslinking agent. It is possible to incorporate the base polymer into liquid B. In the presence of a platinum catalyst, the two-liquid type silicone rubber undergoes a crosslinking reaction, in which the alkenyl groups in the base polymer add hydrogen atoms present in liquid B to yield a crosslinked silicone rubber.

In the polysiloxane containing at least two alkenyl group substituents, each alkenyl group may be present either at a molecular end or as a siloxane side chain. Examples of the alkenyl groups include vinyl, allyl, and α-propenyl. Typical examples of the above polysiloxane include a polymethylsiloxane terminated at each end by a vinyl group which is represented by the following general formula (I) and a polymethylsiloxane containing vinyl group substituents as side chains which is represented by the following general formula (II).

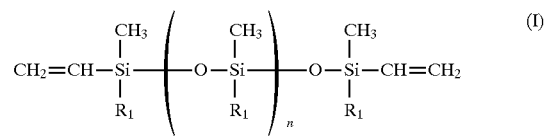

(In general formula (I), $R_1$ represents a lower alkyl group having 1 to 6 carbon atoms, a 3,3,3-trifluoropropyl group, or a phenyl group, and n is an integer of from 20 to 1,000.)

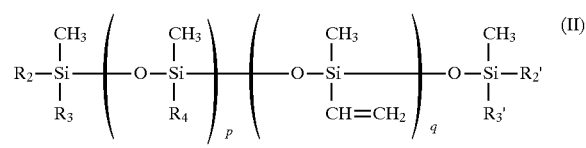

(In general formula (II), $R_2$, $R_3$, $R_2'$, and $R_3'$ may be the same or different and each represents a lower alkyl group having 1 to 6 carbon atoms or a phenyl group; $R_4$ represents a lower alkyl group having 1 to 6 carbon atoms, a 3,3,3-trifluoropropyl group, or a phenyl group; the sum of p and q is from 20 to 1,000; and q is an integer of 3 or larger).

The polysiloxane containing at least two alkenyl group substituents is not construed as being limited to the polymethylsiloxanes represented by general formulae (I) and (II), and may be a polysiloxane represented by formula (I) or (II) wherein the methyl groups have been partly or wholly replaced with other alkyl groups or phenyl or other groups.

Examples of such polysiloxanes include polydimethylsiloxane, polymethylphenylsiloxane, dimethylsiloxane/methylphenylsiloxane copolymers, dimethylsiloxane/methylvinylsiloxane copolymers, methylphenylsiloxane/methylvinylsiloxane copolymers, and dimethylsiloxane/methylvinylsiloxane/dimethylsiloxane copolymers which all are terminated at each end by a vinyl group; and polymethylvinylsiloxane, polyphenylvinylsiloxane, dimethylsiloxane/methylvinylsiloxane copolymers, methylphenylsiloxane/methylvinylsiloxane copolymers, and dimethylsiloxane/methylvinylsiloxane/dimethylsiloxane copolymers which all are terminated at each end by a trimethyl group.

These polysiloxanes each preferably has a degree of polymerization of from 20 to 1,000. A polysiloxane having a degree of polymerization lower than 20 is undesirable in that not only this polysiloxane has enhanced volatility, but also a conductive material, e.g., carbon black, is apt to precipitate and separate therefrom, making it difficult to form an electroconductive elastomer layer having stable properties. On the other hand, a polysiloxane having a degree of polymerization exceeding 1,000 is undesirable in that this polysiloxane, through a crosslinking reaction, gives a silicone rubber in which the content of uncrosslinked silicone polymer components having a number-average molecular weight not lower than 10,000 exceeds 1% by weight, and this necessitates a post-treatment such as extraction with a solvent.

The polyorganohydrogensiloxane should have at least three hydrosilyl (Si—H) groups in the molecule. However, in the case where the base polymer contains three or more alkenyl groups per molecule, a-polyorganohydrogensiloxane having two hydrosilyl groups in the molecule is also usable. Typical examples thereof include polymethylhydrogensiloxanes represented by the following general formulae (III) and (IV).

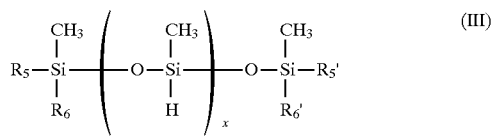
(III)

(In general formula (III), $R_5$, $R_6$, $R_5'$, and $R_6'$ may be the same or different and each represents a lower alkyl group having 1 to 6 carbon atoms or a phenyl group, and x is an integer of from 3 to 50.)

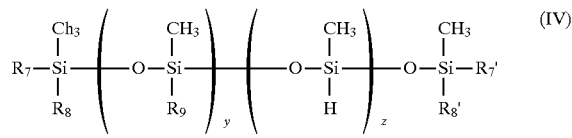
(IV)

(In general formula (IV), $R_7$, $R_8$, $R_7'$, and $R_8'$ may be the same or different and each represents a lower alkyl group having 1 to 6 carbon atoms or a phenyl group; $R_9$ represents a lower alkyl group having 1 to 6 carbon atoms, a 3,3,3-trifluoropropyl group, or a phenyl group; y is an integer of from 5 to 50; and z is an integer of 3 or larger.)

The polyorganohydrogensiloxane is not construed as being limited to the polymethylhydrogensiloxanes represented by general formulae (III) and (IV), and may be a polyorganohydrogensiloxane represented by formula (III) or (IV) wherein the methyl groups have been partly or wholly replaced with other alkyl groups or phenyl or other groups, and wherein x and z each may, of course, be an integer of 2 and either or both of $R_5$ and $R_5'$ and either or both of $R_7$ and $R_7'$ may be hydrogen atoms.

Examples of such polyorganohydrogensiloxanes include polydimethylsiloxane, polymethylphenylsiloxane, dimethylsiloxane/methylphenylsiloxane copolymers, methylhydrogensiloxane/dimethylsiloxane copolymers, methylhydrogensiloxane/methylphenylsiloxane copolymers, and dimethylsiloxane/methylhydrogensiloxane/dimethylsiloxane copolymers which all are terminated at each end by a dimethylhydrogensiloxy group; and polymethylhydrogensiloxane, polyphenylhydrogensiloxane, methylhydrogensiloxane/dimethylsiloxane copolymers, methylhydrogensiloxane/methylphenylsiloxane copolymers, and dimethylsiloxane/methylhydrogensiloxane/dimethylsiloxane copolymers which all are terminated at each end by a trimethyl group. These polysiloxanes each preferably has a degree of polymerization of from 3 to 50.

Into the rubber material are incorporated a conductive material and the platinum catalyst as essential ingredients. A nonconductive filler and other ingredients may be suitably incorporated thereinto.

Examples of the conductive material include carbon black, graphite, various electroconductive metals or alloys such as aluminum, copper, tin, and stainless steel, various electroconductive metal oxides such as tin oxide, zinc oxide, indium oxide, titanium oxide, a tin oxide/antimony oxide solid solution, and a tin oxide/indium oxide solid solution, and insulating substances coated with any of these electroconductive materials. Such conductive materials are used in the form of a fine powder.

Examples of the platinum catalyst include platinum or platinum black fixed to a support, chloroplatinic acid, a solution of chloroplatinic acid in an alcohol or ketone, and a complex compound of an olefin or diketone with chloroplatinic acid. The platinum catalyst is added in an amount of from 1 to 1,000 ppm of the liquid silicone rubber in terms of the amount of platinum metal.

Examples of the nonconductive filler include diatomaceous earth, quartz powder, dry-process silica, wet-process silica, titanium oxide, zinc oxide, aluminosilicic acid, and calcium carbonate.

At least the conductive material and platinum catalyst described above are incorporated into either or both of liquids A and B. Other ingredients including a nonconductive filler are suitably incorporated. Liquid A is mixed with liquid B in a ratio of from 1/0.8 to 1/1.2, preferably 1/1, by weight. Consequently, the base polymer is usually incorporated into liquid B.

For producing a charging member of the present invention using the liquid silicone rubber, the following process can, for example, be utilized. First, liquid A is sufficiently mixed with liquid B by stirring, and the resulting rubber composition is injected into a mold in which an optionally primed electroconductive substrate (1a) is held at the center thereof. This molding is conducted by compression molding, injection molding, transfer molding, extrusion molding, or another molding technique.

The liquid silicone rubber composition is then heated at 80° to 200° C. for 2 to 60 minutes to crosslink the rubber ingredient. If desired and necessary, the composition may be further heated at 180° to 230° C. for about 30 minutes to 6 hours to conduct secondary vulcanization. Thus, a charging member (1) can be produced which consists of the substrate (1a) and, fixed to the outer surface thereof, an electroconductive elastomer layer (1b) comprising a silicone rubber containing a conductive material.

Use of the alkenyl-substituted polysiloxane described above having a degree of polymerization of from 20 to 1,000 or a viscosity of from 20 to 3,000 cP as a base polymer in the above process yields a crosslinked silicone rubber in which the content of uncrosslinked silicone polymer components having a number-average molecular weight of 10,000 or higher is not higher than 1% by weight, thereby eliminating the necessity of removing such uncrosslinked silicone polymer components.

In the present invention, a silicone rubber in which uncrosslinked silicone polymer components having a number average molecular weight of 10,000 or higher are contained in an amount exceeding 1% by weight can also be used. In this case, it is necessary to reduce the content of these uncrosslinked silicone polymer components to 1% by weight or lower. Examples of such a silicone rubber include a millable silicone rubber obtained by crosslinking a raw silicone rubber with a peroxide.

Examples of the raw silicone rubber include polydimethylsiloxane, polymethyltrifluoropropylsiloxane, polymethylvinylsiloxane, polytrifluoropropylvinylsiloxane, polymethylphenylsiloxane, polyphenylvinylsiloxane, and copolymers of these polysiloxanes. These silicone rubbers each preferably has an average degree of polymerization of from 5,000 to 10,000.

Into the millable silicone rubber are incorporated a conductive material and a crosslinking agent as essential ingredients. A nonconductive filler, a dispersing agent, and other ingredients may be suitably incorporated thereinto.

The conductive material and the nonconductive filler may be the same as those usable with the liquid silicone rubber. Examples of the crosslinking agent include peroxides such as di-t-butyl peroxide, 2,5-dimethyl-2,5-di(t-butylperoxy) hexane, dicumyl peroxide, t-butyl peroxybenzoate, and p-chlorobenzoyl peroxide.

For diminishing the uncrosslinked silicone polymer components described above, a solvent extraction treatment, for example, is employed. This solvent extraction treatment, called the Soxhlet method, is carried out by immersing the silicone rubber in an organic solvent and heating the solvent at 80° to 120° C. under vacuum. The heating time is suitably determined according to the content of the uncrosslinked silicone polymer components. Examples of the organic solvent include n-hexane, benzene, toluene, xylene, gasoline, methylene dichloride, carbon tetrachloride, trichloroethane, and ethyl ether.

Thus, the content of uncrosslinked silicone polymer components having a number-average molecular weight of 10,000 or higher in a millable silicone rubber can be reduced to 1% by weight or lower.

The charging member (electroconductive elastomer layer) preferably has a volume resistivity of from $10^5$ to $10^9$ $\Omega$cm. For example, in the case where carbon black is used as the conductive material, it is incorporated in an amount of from 10 to 100 parts by weight per 100 parts by weight of the silicone rubber. If an electroconductive elastomer layer having a volume resistivity lower than $10^5$ $\Omega$cm is used, an excess current flows on the surface of an electrifiable member and this tends to result in leakage when the surface layer has pinholes. On the other hand, if an electroconductive elastomer layer having a volume resistivity higher than $10^9$ $\Omega$cm is used, an electrifiable member is difficult to be charged at a low voltage and the insufficient charge amount causes image defects.

The thickness of the electroconductive elastomer layer may be in the range of from 0.5 to 5.0 mm, and is preferably from 2.0 to 4.0 mm. If the thickness thereof is smaller than 0.5 mm, a uniform nip is difficult to ensure. On the other hand, even if the thickness thereof is increased beyond 5.0 mm, this not only does not lead to an improvement in charging performance, but also is disadvantageous in cost because an increased silicone rubber molding cost results.

The charging member preferably has a hardness of from 20° to 40° as measured in accordance with JIS A ("JIS" stands for the Japanese Industrial Standard). This is because when the hardness (hereinafter the term "hardness" means "JIS A hardness") of the charging member is within the above range, the nip between the charging member and an electrifiable member has exceedingly good evenness and there is hence no possibility of charging failure which may cause image defects. If the hardness of the charging member is lower than 20°, the silicone rubber is unsatisfactory in strain properties, e.g., elastic strain recovery, making it impossible to maintain an even nip over long.

A DC/AC superimposed voltage is applied between the charging member and an electrifiable member as stated hereinabove. The DC voltage is preferably from 300 V to 1 kV, while the peak-to-peak AC voltage is preferably from 1 to 2 kV.

The charging member of the present invention, which basically comprises a single-layer electroconductive silicone rubber fixed to an electroconductive substrate, may have a surface layer, e.g., a resistance control layer, if necessary without particular limitations.

Although the above explanation was made on a roll-form charging member (charging roll), the charging member of the present invention may be in a block or blade form. As shown in FIG. 2, a block- or blade-form charging member 2 or 3 comprises an electroconductive elastomer layer 2b or 3b bonded and fixed to a plate-form electroconductive substrate 2a or 3a on that side of the layer 2b or 3b which is remote from an electrifiable member against which the charging member is to be pressed in the direction of the thickness thereof.

Besides being used in a charging device, the charging member of the present invention is also applicable to a transfer device, an eraser, etc. In the case where the charging member of the present invention is used as a charging member in a transfer device, the charging member is regulated so as to have a volume resistivity of from $10^4$ to $10^{10}$ $\Omega$cm, and is pressed against an electrifiable member, e.g., a photoreceptor, through-a receiving material, e.g., paper. In the case where the charging member of the present invention is used as a charging member in an eraser, the charging member is regulated so as to have a volume resistivity of from $10^2$ to $10^4$ $\Omega$cm, and is directly brought into contact with an electrifiable member.

The charging member of the present invention functions as follows. Since silicone rubbers are highly flexible due to their chemical structure as compared with hydrocarbon rubbers, an electroconductive elastomer layer comprising a silicone rubber containing a conductive material and an inorganic filler can have a hardness as low as 40° or lower even without a softening agent or plasticizer. Because of this, the elastomer layer, when used as a charging member in the form of, e.g., a roll, can not only be evenly pressed against an electrifiable member, but also exhibit stable charging performance since the resistance of the electroconductive layer is completely independent of temperature and humidity.

Silicone rubbers having such excellent properties contain uncrosslinked polymer components having a number-average molecular weight of 10,000 or higher generally in an amount of several percents. These polymer components have conventionally been regarded as not causative of the image defects attributable to bleeding. However, of the uncrosslinked polymer components remaining in a silicone rubber, the substances which migrate to an electrifiable member to actually cause image defects are not oligomers but uncrosslinked polymer components having a number-average molecular weight of 10,000 or higher, as described above.

Consequently, the charging member of the present invention, which employs an electroconductive elastomer layer containing a crosslinked silicone rubber in which the content of those uncrosslinked polymer components has been regulated to 1% by weight or lower, is capable of giving satisfactory images having no image defects attributable to bleeding, such as blank spots, while retaining the intact properties of the silicone rubber. Further, this charging member is substantially free from the problem of bleeding over long.

The charging member of the present invention preferably employs, as the crosslinked silicone rubber, a reaction product obtained by crosslinking a vinyl-substituted liquid polymethylsiloxane having a viscosity of 3,000 cP or lower with a polyorganohydrogensiloxane in the presence of a platinum catalyst.

By the selection of the raw polymer and the crosslinking reaction system, the amount of uncrosslinked polymer components having a number-average molecular weight of 10,000 or higher remaining in the resulting crosslinked silicone rubber can be directly reduced to a level substantially free from the possibility of causing image defects.

The present invention is explained below in more detail by reference to Examples, but the invention should not be construed as being limited to the following Examples.
(Image-forming Apparatus)

FIG. 3 is a view illustrating the whole of an image-forming apparatus into which the roll-form charging member of the present invention shown in FIG. 1 has been incorporated. The figure shows a central vertical section taken along the length direction.

The image-forming apparatus U shown in FIG. 3 has within its main body a cylindrical photoreceptor (drum) 11, which rotates in the direction shown by the arrow and functions as an electrostatic latent-image holder. On one side within the main body of the image-forming apparatus U is disposed a laser writing device 12 for writing an electrostatic latent image on the surface of the photoreceptor 11. Disposed in this order around the cylindrical photoreceptor 11 along the direction of the rotation thereof are a charging device 13 for evenly charging the surface of the photoreceptor 11, a developing device 14 for visualizing the electrostatic latent image, a transfer device 15 for transferring the visualized toner image to paper (receiving material), and a cleaner 16 for removing any residual toner present on the photoreceptor 11.

The developing device 14 has a toner container 14a, which is provided inside with stirrers 14b and 14b for stirring a toner, a rotatable developer carrier 14c, and a toner feed roller 14d for feeding a toner to the carrier 14c. The developer carrier 14c is located at the opening of the container 14a, and is supported by the container 14a so as to be slightly spaced from the surface of the photoreceptor 11. The cleaner 16 has a casing 16a. This casing 16a has, fixed thereto, a metallic blade holder 16b, which has a sheet-form cleaning blade 16c fixed to the end thereof. The front end, i.e., edge part, of the cleaning blade 16c is in contact with the surface of the photoreceptor 11.

The image-forming apparatus U has, in a lower part of its main body, a paper tray 17 for storing sheets of paper thereon. The paper tray 17 is equipped, at an upper end thereof, a paper takeout roller 18 for taking out paper sheet by sheet from the paper tray 17. On one side of the paper takeout roller 18 are disposed a pair of paper guides 20 extending upward and serving to guide paper transported by a pair of paper-transporting rollers 19.

On the other side within the main body of the image-forming apparatus U is disposed, in an upper part thereof, a fixing device 21 comprising a heating roller 21a and a pressure roller 21b. Between the fixing device 21 and the transfer device 15 is disposed a transport line 22 for transporting paper bearing a transferred toner image. Above the fixing device 21 are disposed a pair of discharge rollers 23 and a transport line 24 for guiding paper bearing a fixed toner image from the fixing device 21 to the discharge rollers 23. The main body of this image-forming apparatus U has, on its upper surface, a discharge tray 25 for placing sheets of paper discharged through the discharge rollers 23.
(Charging Device)

Figure 4:
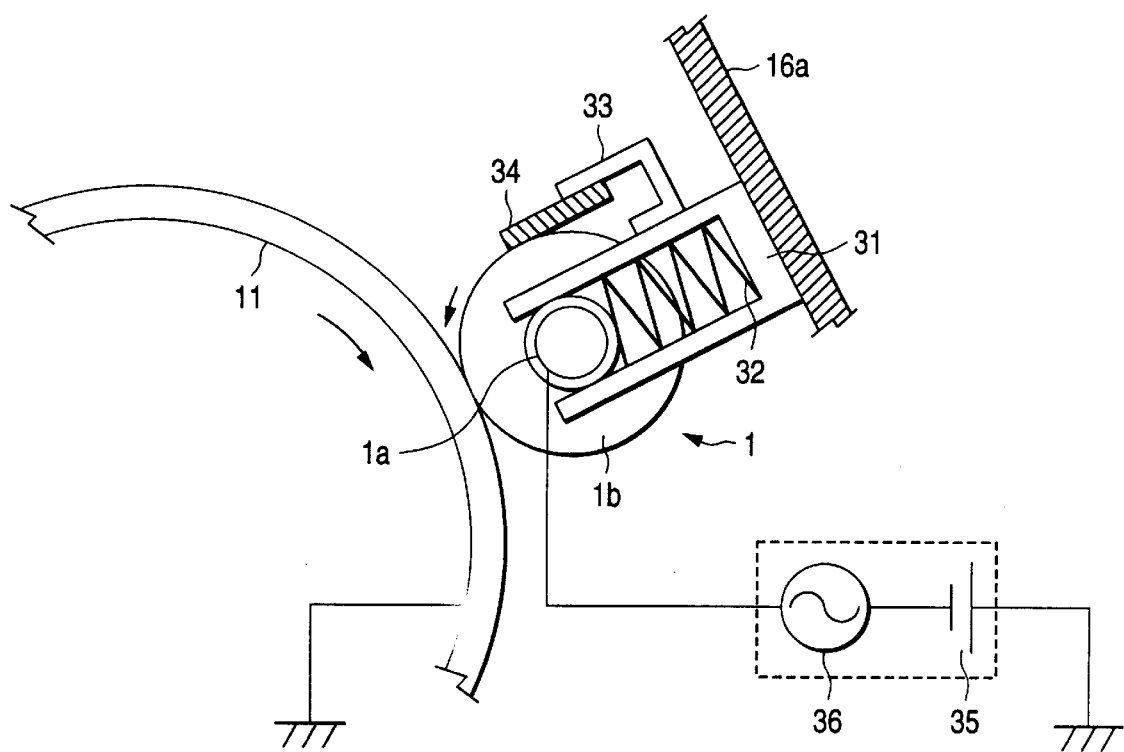
FIG. 4 is an enlarged view illustrating the structure of the charging member shown in FIG. 3.

FIG. 4 is an enlarged view of part of the apparatus shown in FIG. 3, and illustrates the structure of the charging device.

The charging device 13 shown in FIG. 4 has the roll-form charging member 1 shown in FIG. 1. Both ends of the electroconductive substrate 1a of the charging member 1 are supported by a supporting member 31 fixed to the casing 16a of the cleaner 16. The charging member 1 is kept being pressed against and in contact with the surface of the photoreceptor 11 by means of two pressure springs 32 each fixed at one end to the supporting member 31 and at the other end to an end of the substrate 1a. The supporting member 31 has a metallic pad holder 33 fixed thereto, and the pad holder 33 has a sheet-form cleaning pad 34 bonded to the end thereof so that even a slight amount of toner adherent to the surface of the charging member 1 can be removed with the pad.

Further, a superimposed oscillating voltage is applied to the substrate 1a of the charging member 1 with a −350 V DC power source 35 and an AC power source 36 connected thereto in series and having a frequency of 400 Hz and a peak-to-peak voltage ($V_{p-p}$) of 1.5 kV. Thus, the surface of the photoreceptor 11 which is rotating in a given direction while in contact with the electroconductive elastomer layer 1b can be evenly charged by the charging member 1 through the substrate 1a.

The image-forming apparatus U according to the present invention functions in the same manner as prior art image-forming apparatuses. The functions thereof are explained briefly as follows.

As described above, the surface of the photoreceptor 11 which is rotating in the arrow direction is evenly charged by the charging member 1 to which a superimposed oscillating voltage is kept being applied. An electrostatic latent image is written on the evenly charged photoreceptor 11 by means of the laser writing device 12. The electrostatic latent image on the photoreceptor 11 is developed by the developing device 14 to form a toner image. The toner image is transferred by the transfer device 15 to paper transported from the paper tray 17. After the transferred toner image is fixed by the fixing device 21, the paper is discharged onto the discharge tray 25 by means of the discharge rollers 23. On the other hand, the toner remaining on the surface of the photoreceptor 11 after the toner image transfer to paper is removed with the blade 16c of the cleaner to condition the photoreceptor for the next photographic cycle.

EXAMPLE 1

A 1/1 mixture of liquids A and B respectively having the following compositions was-stirred and degassed under vacuum to prepare a silicone rubber compound. In the following formulations, all parts are by weight.

| Liquid A | |
|---|---|
| Polymethylsiloxane represented by general formula (I) (where $R_1$: methyl, n = 420; viscosity, 1,500 cP) | 100 parts |
| Dry-process silica | 5 parts |
| Isopropanol solution of chloroplatinic acid (platinum content, 3 wt %) | 0.1 part |
| Liquid B | |
| Same polymethylsiloxane represented by general formula (I) as the above | 100 parts |
| Carbon black | 30 parts |
| Polymethylhydrogensiloxane represented by general formula (IV) (where $R_7$ to $R_9$: methyl, y = 20, z = 3; viscosity, 10 cP) | 0.5 parts |

Subsequently, a primed SUS substrate (1a) having an outer diameter of 6 mm was inserted into a cylindrical mold with an inner diameter of 12 mm and concentrically supported therein. The rubber compound described above was packed into the cavity of this mold by injection molding, and the contents were heated at 120° C. for 30 minutes to crosslink the liquid silicone rubber. The resulting molded object was taken out of the mold and then subjected to secondary vulcanization in a heating oven at 200° C. for 4 hours.

Thus, a roll-form charging member (1) was produced which had an electroconductive elastomer layer (1b) having an outer diameter of 11.9 mm (thickness, 2.95 mm) and made of a crosslinked silicone rubber molding containing carbon black. This charging member (1) had a hardness of 35° and a volume resistivity of $5\times10^8$ Ωcm.

EXAMPLE 2

The same polymethylsiloxane represented by general formula (I) as in Example 1 was stripped beforehand at 100° C. under vacuum to reduce the content of oligomer components having a degree of polymerization of 20 or lower to 1,000 ppm or lower. Thereafter, a roll-form charging member (1) was produced in the same manner as in Example 1, except that the pretreated silicone polymer was used in place of the polydimethylsiloxane in each of liquids A and B.

COMPARATIVE EXAMPLE 1

A roll-form charging member (1) was produced in the same manner as in Example 1, except that a silicone polymer having a viscosity of 5,000 cP was used in place of the polydimethylsiloxane in each of liquids A and B. The rubber compound gave a crosslinked silicone rubber molding in which the content of silicone polymer components having a number-average molecular weight of 10,000 or higher was 1.2% by weight.

COMPARATIVE EXAMPLE 2

A hundred parts by weight of a millable silicone rubber compound (SE4639, manufactured by Toray-Dow Corning Co., Ltd.) containing about 35 wt % carbon black as a conductive material was kneaded with an open roll mill for 10 minutes together with 1.5 parts by weight of a peroxide containing vulcanizer paste (RC-4 50PFD, manufactured by Toray-Dow Corning Co., Ltd.). Thus, a silicone rubber composition containing carbon black evenly dispersed therein was prepared.

Subsequently, a primed SUS substrate (1a) having an outer diameter of 6 mm was inserted into a cylindrical mold with an inner diameter of 12 mm and concentrically supported therein. The rubber composition described above was packed into the cavity of this mold by injection molding, and the contents were heated at 170° C. for 3 minutes to conduct vulcanization molding.

Thus, a roll-form charging member (1) was produced which had an electroconductive elastomer layer (1b) having an outer diameter of 11.8 mm (thickness, 2.9 mm) and made of a silicone rubber molding containing carbon black. This charging member (1) had a hardness of 35° and a volume resistivity of $5\times10^8$ Ωcm.

COMPARATIVE EXAMPLE 3

The charging member (1) produced in Comparative Example 2 was heated in a 200° C. oven for 24 hours to remove polysiloxane oligomer components having a degree of polymerization of 20 or lower. This heat-treated roll was subjected as a charging member-to the image evaluation test described later.

EXAMPLE 3

The charging member (1) produced in Comparative Example 2 was subjected to a 24-hour extraction treatment with toluene solvent using a reflux apparatus similar to a Soxhlet extractor. As a result, the total amount of extractables was 0.7% by weight. This extraction-treated roll was subjected as a charging member to the image evaluation test described later.

Each charging member was analyzed by gas chromatography to determine the amount of polysiloxane oligomers (ppm) having a degree of polymerization of from 4 to 20 remaining in the roll. Further, each charging member was subjected to an extraction treatment by the Soxhlet method used in Example 3 to determine the total amount of solvent extractables. The content of silicone polymer components having a number-average molecular weight of 10,000 or higher in those extractables was also determined by GPC. The results obtained are summarized in Table 1.

TABLE 1

|  | Ex. 1 | Ex. 2 | Ex. 3 | Comp. Ex. 1 | Comp. Ex. 2 | Comp. Ex. 3 |
|---|---|---|---|---|---|---|
| Material for rubber layer | liquid silicone | liquid silicone | millable silicone rubber | liquid silicone | millable silicone rubber | millable silicone rubber |
| Pre- or post-treatment | none | stripping as pre-treatment | solvent extraction as post-treatment | none | none | heating as post-treatment |
| Amount of oligomers (degree of polymerization, 4–20) | 5500 | 800 | 200 | 6000 | 8000 | 1500 |
| Total amount of solvent extractables | 2.8 | 2.3 | 0.7 | 2.7 | 4.3 | 3.7 |
| Amount of extractables with mol. wt. of $10^4$ or higher | 0.45 | 0.45 | 0.6 | 1.2 | 2.6 | 2.2 |

(Image Evaluation Test)

Each charging member was fitted to the charging device (13) of an electrostatic printer (XP-10, manufactured by Fuji Xerox Co., Ltd.) to evaluate the environmental stability of charging performance and to conduct a bleed test.

In the evaluation of environmental stability, each charging member was examined for charging performance in three atmospheres, i.e., low-temperature low-humidity (10° C., 15% RH), ordinary-temperature ordinary-humidity (25° C., 50% RH), and high-temperature high-humidity (35° C., 85% RH) atmospheres. In the bleed test, the printer was allowed to stand at 45° C. and 85% RH for 2 weeks, and then examined for image defects caused by bleeding substances which had migrated to the OPC (organic photoreceptor).

The results of the evaluation of each charging member for environmental stability and bleeding are summarized in Table 2, wherein the symbols indicate the following ratings.

o: no trouble

Δ: very slight blank spots generated x: blank spots generated

TABLE 2

|  | Environmental Stability | | | |
|---|---|---|---|---|
|  | Low-temperature low-humidity | Ordinary-temperature ordinary-humidity | High-temperature high-humidity | Bleed test |
| Ex. 1 | o | o | o | o |
| Ex. 2 | o | o | o | o |
| Ex. 3 | o | o | o | Δ |
| Comp. Ex. 1 | o | o | o | x |
| Comp. Ex. 2 | o | o | o | x |
| Comp. Ex. 3 | o | o | o | x |

In the above tests, the charging members of Examples 1 to 3, in which the content of silicone polymer components having a number-average molecular weight of 10,000 or higher was not higher than 1% by weight, each gave satisfactory results, although use of the charging member of Example 3, which had been obtained by treating the charging member of Comparative Example 2 with a solvent, resulted in very slight blank spots in the bleed test.

In contrast, the charging members of Comparative Examples 1 to 3 each caused blank spots in the bleed test, although they gave satisfactory results in the environmental stability test. A comparison between Example 1 and Comparative Example 3 clearly shows that blank spots are attributable to the bleeding of silicone polymer components having a number-average molecular weight of 10,000 or higher in view of the fact that such image defects generated even with the charging member in which silicone oligomers having a degree of polymerization of 20 or lower had been diminished to a sufficiently low level.

(Reference Test)

Polydimethylsiloxane silicone oils respectively having viscosities of 2 cP, 20 cP, 200 cP, and 2,000 cP each was directly applied to the surface of the photoreceptor of an electrostatic printer (XP-10, manufactured by Fuji Xerox Co., Ltd.) to examine the generation of image defects. As a result, use of the photoreceptors whose surface had been coated with the oils respectively having viscosities of 200 cP and 2,000 cP resulted in the same image defects as the blank spots characteristic of silicone rubbers.

The polydimethylsiloxanes used above, which had viscosities of 2 cP, 20 cP, 200 cP, and 2,000 cP, had average degrees of polymerization of 5 (corresponding to a number-average molecular weight of about 400), 20 (molecular weight, about 1,500), 150 (molecular weight, about 10,000), and 470 (molecular weight, about 35,000), respectively.

According to the present invention, the substances causative of the image defects attributable to bleeding from charging members containing a silicone rubber as a component have been identified and, as a result, a charging member free from the possibility of causing image defects attributable to bleeding is provided while maintaining the completely intact low hardness and environmental stability of electrical resistance both inherent in silicone rubbers, without forming an antifouling layer for inhibiting the migration of low-molecular weight components to an electrifiable member or the like.

Moreover, in the case where suitably selected raw silicone polymers and crosslinking reaction systems are used, it is possible to directly obtain a crosslinked silicone rubber in which the content of uncrosslinked polymer components having a number-average molecular weight of 10,000 or higher has been reduced to a level free from the possibility of causing image defects, without need of any special treatment.

While the invention has been described in detail and with reference to specific embodiments thereof, it will be apparent to one skilled in the art that various changes and modifications can be made therein without departing from the spirit and scope thereof.

What is claimed is:

1. A charging member comprising an electroconductive substrate and an electroconductive elastomer layer fixed to a surface of the electroconductive substrate, the electroconductive elastomer layer comprising a crosslinked silicone rubber in which the content of uncrosslinked silicone polymer components having a number-average molecular weight of 10,000 or higher is not higher than 1% by weight.

2. The charging member as claimed in claim 1, wherein the crosslinked silicone rubber is a reaction product obtained by reacting a liquid polymethylsiloxane having a viscosity as measured at 25° C. of 3,000 cP or lower and containing at least two vinyl group substituents with a polyorganohydrogensiloxane as a crosslinking agent in the presence of a platinum catalyst.

3. The charging member as claimed in claim 1, wherein the crosslinked silicone rubber is a reaction product obtained by reacting a polysiloxane having at least two alkenyl group substituents with a polyorganohydrogensiloxane as a crosslinking agent.

4. The charging member as claimed in claim 3, wherein the polysiloxane has a degree of polymerization of from 20 to 1,000.

5. The charging member as claimed in claim 3, wherein the reaction product is obtained in the presence of a platinum catalyst.

6. The charging member as claimed in claim 3, wherein the polysiloxane is a polymethylsiloxane represented by:

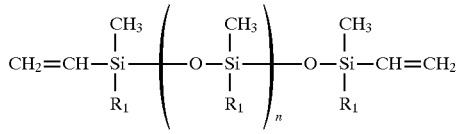

wherein $R_1$ represents a lower alkyl group having 1 to 6 carbon atoms, a 3,3,3-trifluoropropyl group or a phenyl group, and n is an integer of from 20 to 1,000.

7. The charging member as claimed in claim 3, wherein the polysiloxane is a polymethylsiloxane represented by:

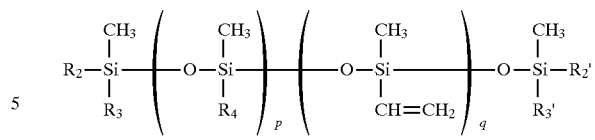

wherein $R_2$, $R_3$, $R_2'$ and $R_3'$ are the same or different and each represents a lower alkyl group having 1 to 6 carbon atoms, or a phenyl group, $R_4$ represents a lower alkyl group having 1 to 6 carbon atoms, a 3,3,3-trifluoropropyl group or a phenyl group, the sum of integers p and q is from 20 to 1,000, and q is an integer of 3 or larger.

8. The charging member as claimed in claim 3, wherein the polyorganohydrogensiloxane contains at least three hydrosilyl (Si—H) groups in the molecule.

9. The charging member as claimed in claim 3, wherein the alkenyi-substituted polysiloxane contains three or more alkenyl groups per molecule and wherein the polyorganohydrogensiloxane has two hydrosilyl (Si—H) groups in the molecule.

10. The charging member as claimed in claim 3, wherein the polyorganohydrogensiloxane is a polymethylhydrogensiloxane represented by:

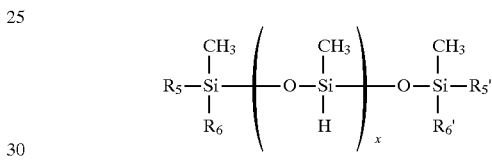

wherein $R_5$, $R_6$, $R_5'$ and $R_6'$ are the same or different and each represents a lower alkyl group having 1 to 6 carbon atoms or a phenyl group, and x is an integer of from 3 to 50.

11. The charging member as claimed in claim 3, wherein the polyorganohydrogensiloxane is a polymethylhydrogensiloxane represented by:

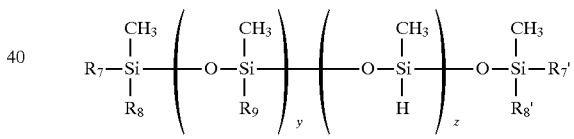

wherein $R_7$, $R_8$, $R_7'$ and $R_8'$ are the same or different and each represents a lower alkyl group having 1 to 6 carbon atoms or a phenyl group, $R_q$ represents a lower alkyl group having 1 to 6 carbon atoms, a 3,3,3-trifluoropropyl group or a phenyl group, y is an integer of from 5 to 50, and z is an integer of 3 or larger.

12. The charging member as claimed in claim 1, wherein the electroconductive elastomer layer has a volume resistivity of from $10^5$ to $10^9 \Omega\text{cm}$.

13. The charging member as claimed in claim 1, wherein the electroconductive elastomer layer has a thickness of from 0.5 to 5.0 mm.

14. The charging member as claimed in claim 1, which a hardness as measured in accordance with JIS A of from 20° to 40°.

* * * * *